US011799107B2

(12) United States Patent
Lee et al.

(10) Patent No.: US 11,799,107 B2
(45) Date of Patent: Oct. 24, 2023

(54) OXYGEN SUPPLY APPARATUS AND METHOD FOR FUEL CELL OF AIRCRAFT

(71) Applicants: Hyundai Motor Company, Seoul (KR); Kia Corporation, Seoul (KR)

(72) Inventors: Joung Ho Lee, Gyeonggi-do (KR); Nam Woo Lee, Gyeonggi-do (KR); Hee Sung Yoon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/501,966

(22) Filed: Oct. 14, 2021

(65) Prior Publication Data

US 2022/0231315 A1 Jul. 21, 2022

(30) Foreign Application Priority Data

Jan. 18, 2021 (KR) .................. 10-2021-0006676

(51) Int. Cl.
| *H01M 8/04746* | (2016.01) |
| *H01M 8/04082* | (2016.01) |
| *H01M 8/04089* | (2016.01) |
| *H01M 8/04537* | (2016.01) |
| *B64D 41/00* | (2006.01) |

(52) U.S. Cl.
CPC ........ *H01M 8/04753* (2013.01); *B64D 41/00* (2013.01); *H01M 8/04089* (2013.01); *H01M 8/04201* (2013.01); *H01M 8/04559* (2013.01); *H01M 8/04619* (2013.01); *B64D 2041/005* (2013.01); *H01M 2250/20* (2013.01)

(58) Field of Classification Search
CPC ......... H01M 8/04753; H01M 8/04089; H01M 8/04201; H01M 8/04559; H01M 8/04619; H01M 8/04111; H01M 8/04438; H01M 8/04604; H01M 8/04798; H01M 8/04552; B64D 41/00; B64D 45/00
See application file for complete search history.

(56) References Cited

U.S. PATENT DOCUMENTS

| 9,028,990 | B2 * | 5/2015 | Gans | ................. | H01M 8/04201 |
| | | | | | 429/428 |
| 2010/0071371 | A1 * | 3/2010 | Arendt | .............. | H01M 8/04082 |
| | | | | | 60/706 |
| 2017/0125831 | A1 * | 5/2017 | Gasner | .............. | H01M 8/04201 |

(Continued)

FOREIGN PATENT DOCUMENTS

| JP | 5083560 B2 | 11/2012 |
| KR | 100862445 B1 | 10/2008 |
| KR | 101786178 B1 | 10/2017 |

*Primary Examiner* — Stewart A Fraser
(74) *Attorney, Agent, or Firm* — Fox Rothschild LLP

(57) ABSTRACT

An oxygen supply apparatus and method for a fuel cell of an aircraft are provided. The oxygen supply apparatus includes a compressor that generates compressed air by compressing air in the atmosphere and supplies the compressed air to a fuel cell stack, an oxygen tank having a predetermined amount of oxygen stored therein. An aircraft monitoring device monitors the aircraft and determines whether oxygen supply from the oxygen tank is required, and an oxygen supply means switching device switches an oxygen supply means for the fuel cell stack from the compressor to the oxygen tank, or vice versa depending on an outcome of the monitoring.

18 Claims, 14 Drawing Sheets

(56) References Cited

U.S. PATENT DOCUMENTS

2020/0180774 A1* 6/2020 Rainville ................ B60L 50/70
2020/0391876 A1* 12/2020 Morrison ............... B64D 43/00
2020/0398992 A1* 12/2020 Morrison ............... B64D 27/24

* cited by examiner

OXYGEN SUPPLY APPARATUS AND METHOD FOR FUEL CELL OF AIRCRAFT

CROSS-REFERENCE TO RELATED APPLICATION

This application claims the benefit of priority to Korean Patent Application No. 10-2021-0006676, filed on Jan. 18, 2021, the entire contents of which are incorporated herein by reference.

TECHNICAL FIELD

The present disclosure relates to an oxygen supply apparatus and method for a fuel cell of an aircraft that performs control to appropriately supply oxygen to a fuel cell stack.

BACKGROUND

In general, a fuel cell produces electricity through an electro-chemical reaction of hydrogen and oxygen, and the supply of oxygen has to be appropriately maintained for a reaction with hydrogen fuel. In particular, a fuel cell of an aircraft requires high specific power (kW/kg), and therefore current and voltage characteristics of the fuel cell have to be improved. Accordingly, partial pressure of oxygen has to be increased, and a compressor capable of increasing the oxygen partial pressure by compressing air is generally provided on a path along which air in the atmosphere is supplied to a fuel cell stack.

However, the atmospheric pressure is reduced as the aircraft gains height, and therefore the compression ratio of air has to be increased to implement the same voltage as that in a usual atmospheric pressure state. Accordingly, power consumption of the compressor is increased, which causes loss of net power generated by the fuel cell stack.

Recently, to solve the problem occurring when the compression ratio of air is increased, a technology for directly supplying oxygen to a fuel cell stack through a separate oxygen supply system including a high-pressure oxygen tank and a pressure adjustment device instead of compressing air in the atmosphere and supplying the compressed air to the fuel cell stack has been developed. However, the separate oxygen supply system including the high-pressure oxygen tank may increase the total weight of a fuel cell system and may increase fuel consumption of an aircraft.

SUMMARY

The present disclosure has been made to solve the above-mentioned problems occurring in the prior art while advantages achieved by the prior art are maintained intact. An aspect of the present disclosure provides an oxygen supply apparatus and method for a fuel cell of an aircraft that stably supplies oxygen required for various operation environments of the aircraft to a fuel cell stack without storing a large amount of pure oxygen, in which the oxygen supply apparatus may include a compressor configured to generate compressed air by compressing air in the atmosphere and supply the compressed air to the fuel cell stack, an oxygen tank having a predetermined amount of oxygen stored therein, an aircraft monitoring device configured to monitor the aircraft and determine whether oxygen supply from the oxygen tank is required, and an oxygen supply means switching device configured to switch an oxygen supply means for the fuel cell stack from the compressor to the oxygen tank, or vice versa depending on an outcome of the monitoring.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an oxygen supply apparatus for a fuel cell of an aircraft may include a compressor configured to generate compressed air by compressing air in the atmosphere and supply the compressed air to a fuel cell stack, an oxygen tank having a predetermined amount of oxygen stored therein, an aircraft monitoring device configured to monitor the aircraft and determine whether oxygen supply from the oxygen tank is required, and an oxygen supply means switching device configured to switch an oxygen supply means for the fuel cell stack from the compressor to the oxygen tank, or vice versa depending on an outcome of the monitoring.

The aircraft monitoring device may include a flight altitude determination device configured to determine whether to change the oxygen supply means based on a change in a flight altitude of the aircraft, such that the compressed air is supplied to the fuel cell stack by the compressor when the flight altitude of the aircraft is lower than a preset reference altitude and the oxygen stored in the oxygen tank is supplied to the fuel cell stack when the flight altitude of the aircraft is higher than the reference altitude.

The flight altitude determination device may include an altitude comparator configured to receive a current flight altitude from an altimeter provided in the aircraft and compare the current flight altitude with the preset reference altitude. The flight altitude determination device may include a cell voltage comparator configured to estimate the flight altitude of the aircraft by comparing the average of cell voltages measured by a stack voltage monitoring (SVM) device provided in the fuel cell with a preset reference voltage.

The cell voltage comparator may be configured to estimate that the aircraft flies at an altitude lower than the reference altitude, when the average of the cell voltages measured by the stack voltage monitoring device is greater than the reference voltage, and the cell voltage comparator may be configured to estimate that the aircraft flies at an altitude higher than the reference altitude, when the average of the cell voltages is less than the reference voltage. The aircraft monitoring device may include a flight mode determination device configured to determine whether a flight mode of the aircraft is a cruising mode or a taking-off/landing mode and determine whether to change the oxygen supply means depending on a change in the flight mode of the aircraft, such that when the flight mode is the cruising mode, the compressed air is supplied to the fuel cell stack by the compressor, and when the flight mode is the taking-off/landing mode, the oxygen stored in the oxygen tank is supplied to the fuel cell stack.

The flight mode determination device may include an altitude change comparator configured to calculate an altitude change of the aircraft for a predetermined reference period of time, compare an absolute value of the calculated altitude change with a preset reference altitude change, determine that the aircraft is in the cruising mode when the absolute value of the calculated altitude change is less than the reference altitude change, and determine that the aircraft is in the taking-off/landing mode when the absolute value of the calculated altitude change is greater than the reference altitude change. The flight mode determination device may include a wing shape determination device configured to determine that the aircraft is in the cruising mode when a flap of a wing of the aircraft is in a neutral state and determine that the aircraft is in the taking-off/landing mode when the flap of the wing of the aircraft is in a flat state.

The aircraft monitoring device may include an output power comparator configured to compare an output power requirement that has to be generated in the fuel cell for operation of the aircraft with preset reference output power and determine whether to change the oxygen supply means based on a change in the output power requirement that has to be generated in the fuel cell, to supply the compressed air to the fuel cell stack by the compressor when the output power requirement is less than the reference output power and the oxygen stored in the oxygen tank is supplied to the fuel cell stack when the output power requirement is greater than the reference output power.

The oxygen supply means switching device may include a valve switching controller configured to execute selective opening/closing of a compressed-air supply valve and a pure oxygen supply valve based on a determination result of the aircraft monitoring device, the compressed-air supply valve being provided at an output end from which the compressed air generated by the compressor is supplied, and the pure oxygen supply valve being provided at an output end from which the oxygen stored in the oxygen tank is supplied.

The valve switching controller may be configured to switch the oxygen supply means for the fuel cell stack by opening one of the compressed-air supply valve and the pure oxygen supply valve and closing the remaining valve. The compressor may be implemented with a shut-off type compressor that, when turned off, automatically close a path along which air is movable, and the oxygen supply means switching device may include a compressor OFF controller configured to change the oxygen supply means for the fuel cell stack by turning off the compressor while opening a pure oxygen supply valve provided at an output end from which the oxygen stored in the oxygen tank is supplied, or by closing the pure oxygen supply valve while turning on the compressor, based on a determination result of the aircraft monitoring device.

According to another aspect of the present disclosure, an oxygen supply apparatus for a fuel cell of an aircraft may include a compressor configured to generate compressed air by compressing air in the atmosphere and supply the compressed air to a fuel cell stack, an oxygen tank having a predetermined amount of oxygen stored therein and including a pure oxygen supply valve that adjusts whether to supply the oxygen, in which an oxygen supply path is connected to a compressed-air supply path extending from the compressor to the fuel cell stack, an aircraft monitoring device configured to monitor the aircraft and determine whether oxygen supply from the oxygen tank is required, and an additional oxygen supply controller configured to adjust whether to open or close the pure oxygen supply valve, based on a monitoring result and perform control such that oxygen supplied to the fuel cell stack is only the compressed air, or a mixture of the compressed air and the oxygen.

The additional oxygen supply controller may be configured to perform control to consistently maintain the supply of the compressed air from the compressor to the fuel cell stack and additionally supply a predetermined amount of oxygen to the compressed-air supply path only when a determination result of the aircraft monitoring device shows that required output power of the aircraft is greater than preset reference output power, a flight altitude of the aircraft is higher than a preset reference altitude, a flight mode of the aircraft is a taking-off/landing mode.

According to another aspect of the present disclosure, an oxygen supply method for a fuel cell of an aircraft may include a compressed-air supply step of compressing, by a compressor, air in the atmosphere to generate compressed air and supplying the compressed air to a fuel cell stack, an aircraft monitoring step of monitoring the aircraft to determine whether the compressed air supplied from the compressor is able to respond to an output power requirement of the aircraft or whether oxygen supply from an oxygen tank is required, an oxygen supply means switching step of switching an oxygen supply means for the fuel cell stack from the compressor to the oxygen tank, or vice versa depending on an outcome of the monitoring, and a pure oxygen supply step of supplying oxygen stored in the oxygen tank to the fuel cell stack when the oxygen supply means is switched to the oxygen tank.

The aircraft monitoring step may include a flight altitude determination process of determining whether to change the oxygen supply means based on a change in a flight altitude of the aircraft, to supply the compressed air to the fuel cell stack by the compressor when the flight altitude of the aircraft is lower than a preset reference altitude and the oxygen stored in the oxygen tank is supplied to the fuel cell stack when the flight altitude of the aircraft is higher than the reference altitude.

The aircraft monitoring step may include a flight mode determination process of determining whether a flight mode of the aircraft is a cruising mode or a taking-off/landing mode and determining whether to change the oxygen supply means based on a change in the flight mode of the aircraft, such that when the flight mode is the cruising mode, the compressed air is supplied to the fuel cell stack by the compressor, and when the flight mode is the taking-off/landing mode, the oxygen stored in the oxygen tank is supplied to the fuel cell stack.

The aircraft monitoring step may include an output power comparison process of comparing an output power requirement that has to be generated in the fuel cell for operation of the aircraft with preset reference output power and determining whether to change the oxygen supply means based on a change in the output power requirement that has to be generated in the fuel cell, to supply the compressed air to the fuel cell stack by the compressor when the output power requirement is smaller than the reference output power and the oxygen stored in the oxygen tank is supplied to the fuel cell stack when the output power requirement is greater than the reference output power.

The oxygen supply means switching step may include a valve switching control process of selectively opening/closing of a compressed-air supply valve and a pure oxygen supply valve based on a determination result in the aircraft monitoring step, wherein the compressed-air supply valve is provided at an output end from which the compressed air generated by the compressor is supplied, and the pure oxygen supply valve is provided at an output end from which the oxygen stored in the oxygen tank is supplied.

According to another aspect of the present disclosure, an oxygen supply method for a fuel cell of an aircraft may include a compressed-air supply step of compressing, by a compressor, air in the atmosphere to generate compressed air and supplying the compressed air to a fuel cell stack, an aircraft monitoring step of monitoring the aircraft to determine whether the compressed air supplied from the compressor is able to respond to an output power requirement of the aircraft or whether oxygen supply from an oxygen tank is required, and an additional oxygen supply step of consistently maintaining the supply of the compressed air from the compressor to the fuel cell stack and additionally supplying oxygen stored in the oxygen tank to a path along which the compressed air is supplied, when a determination result in the aircraft monitoring step shows that it is difficult to respond to the output power requirement with only oxygen in the compressed air due to a high output power requirement of the aircraft or a high altitude thereof.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
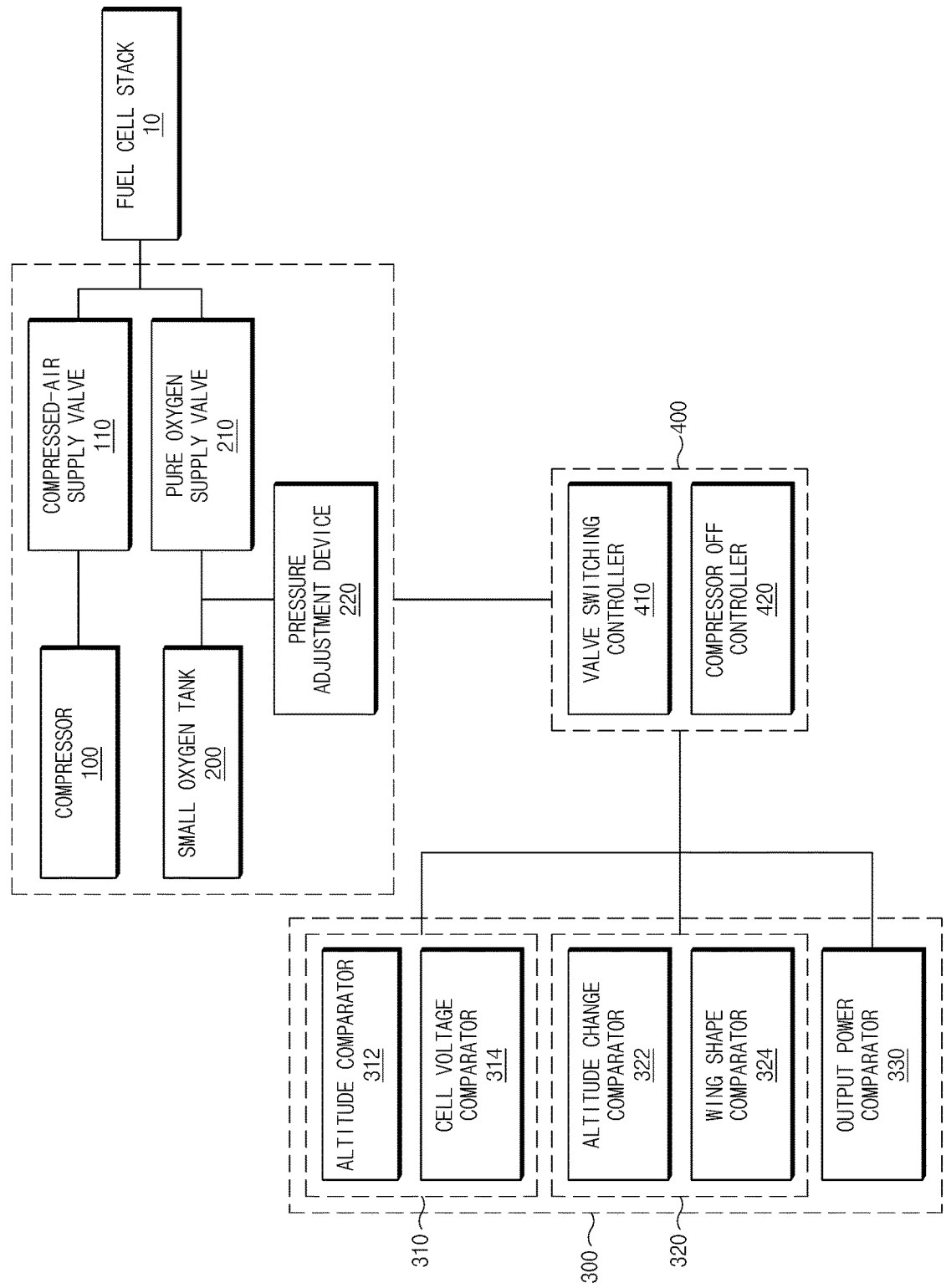
FIG. 1 is a block diagram of an oxygen supply apparatus for a fuel cell of an aircraft according to the present disclosure.
Figure 2:
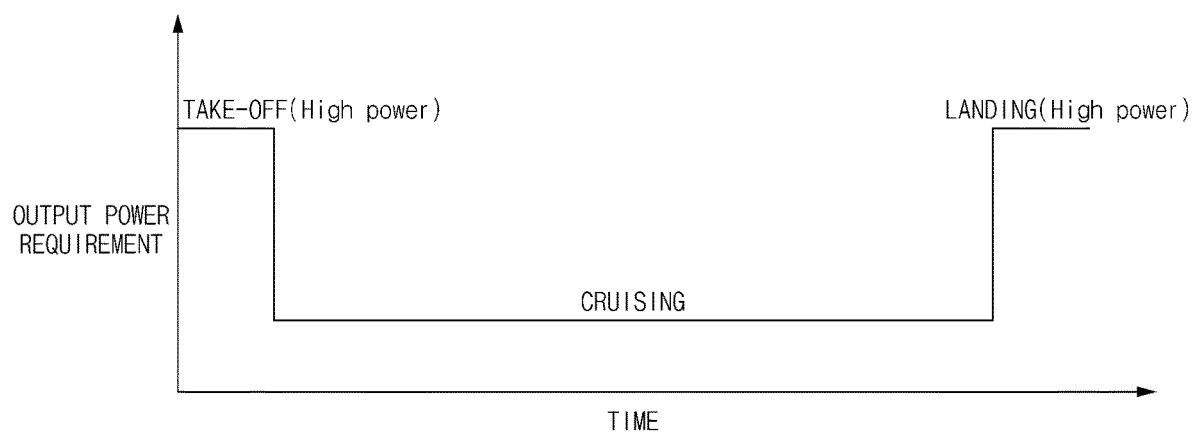
FIG. 2 is a graph depicting an output power requirement increase/decrease profile of the aircraft.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In describing the components of the embodiment according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 14. FIG.

1 is a block diagram of an oxygen supply apparatus for a fuel cell of an aircraft according to the present disclosure.

Referring to FIG. 1, the oxygen supply apparatus for the fuel cell of the aircraft according to the present disclosure may include a compressor 100 configured to generate compressed air by compressing air in the atmosphere and supply the compressed air to a fuel cell stack 10, a small oxygen tank 200 having a predetermined amount of pure oxygen stored therein, an aircraft monitoring device 300 configured to monitor the aircraft in flight and determines whether pure oxygen supply from the small oxygen tank 200 is required, and an oxygen supply means switching device 400 configured to switch an oxygen supply means for the fuel cell stack 10 from the compressor 100 to the small oxygen tank 200, or vice versa depending on an outcome of the monitoring.

The compressor 100 may be configured to compress air in the atmosphere and supply the compressed air to the fuel cell stack 10 in the aircraft. The compressor 100 is implemented with a conventional compressor provided in a fuel cell system to raise oxygen partial pressure. The compressor 100 may include, at an output end thereof, a compressed-air supply valve 110 that opens and closes a path along which the compressed air is supplied to the fuel cell stack 10. The oxygen supply means switching device 400 may be configured to open the compressed-air supply valve 110 when the supply of oxygen to the fuel cell stack 10 depends on the compressor 100 and close the compressed-air supply valve 110 when the supply of oxygen to the fuel cell stack 10 depends on the small oxygen tank 200.

When the compressor 100 is implemented with a shut-off type compressor 150 capable of automatically stopping the supply of compressed air while being switched to a turned-off state, the shut-off type compressor 150 may be configured to stop the supply of oxygen by OFF control of the oxygen supply means switching device 400 even without the compressed-air supply valve 110 that has to be separately ON/OFF controlled. The small oxygen tank 200 may be implemented with a storage tank having a predetermined amount of pure oxygen stored therein and may include, at an output end thereof, a pure oxygen supply valve 210 that opens and closes a path along which the pure oxygen is supplied to the fuel cell stack 10. The oxygen supply apparatus may further include a pressure adjustment device 220 configured to adjust a supply pressure of the pure oxygen supplied from the small oxygen tank 200 to the fuel cell stack 10.

The oxygen supply apparatus according to the present disclosure, which includes both the compressor 100 and the small oxygen tank 200, may be configured to appropriately change the oxygen supply means from the compressor 100 to the small oxygen tank 200, or vice versa depending on flight situations of the aircraft while monitoring the flight situations, to supply the compressed air generated by the compressor 100 to the fuel cell stack 10 in a flight mode in which the aircraft flies at a low altitude or high output power is not required, and the pure oxygen stored in the small oxygen tank 200 is supplied to the fuel cell stack 10 only in a flight mode in which the aircraft flies at a high altitude where air is insufficient in the atmosphere or it is difficult to meet a high output power requirement with only the compressed air.

Since the oxygen supply means is automatically changed from the compressor 100 to the small oxygen tank 200, or vice versa based on the outcome of monitoring the flight situations of the aircraft, an increase in power consumption of the compressor 100 for implementation of an excessive compression ratio experienced when the supply of oxygen to the fuel cell stack 10 depends on only the compressor 100 may be prevented, and an increase in the volume and weight of the fuel cell system experienced when the supply of oxygen to the fuel cell stack 10 depends on only the small oxygen tank 200 may be minimized.

In the present disclosure, the oxygen tank that stores only an amount of oxygen required in a section in which it is difficult to respond using the compressor 100 is referred to as the small oxygen tank 200 to be distinguished from a conventional large oxygen tank required when the supply of oxygen to the fuel cell stack 10 depends on only the pure oxygen stored in the oxygen tank.

The section in which it is difficult to respond using the compressor 100 means a high output power section in which it is difficult to respond to the output power requirement of the aircraft due to a deficiency in performance of the compressor 100 at a specific altitude or more or during taking-off and landing requiring high output power. In the remaining section other than the high output power section, that is, at a low altitude where the compressor 100 is able to respond to the output power requirement of the aircraft or in a cruising section in which a high output power requirement is not required, air in the atmosphere may be compressed and supplied to the stack. Accordingly, oxygen may be stably supplied without using the pure oxygen stored in the small oxygen tank 200.

Furthermore, the aircraft monitoring device 300 may be configured to determine whether the aircraft is in a situation in which high output power requiring stable supply of pure oxygen is required or a situation in which all that needs to be done is compressing and supplying air in the atmosphere, based on a change in the altitude of the aircraft in flight, the current flight mode, or a change in the output power requirement. In general, as shown in the output power requirement increase/decrease profile of the aircraft illustrated in FIG. 2, the aircraft requires high output power when taking-off or landing and requires relatively low output power when cruising.

Figure 3:
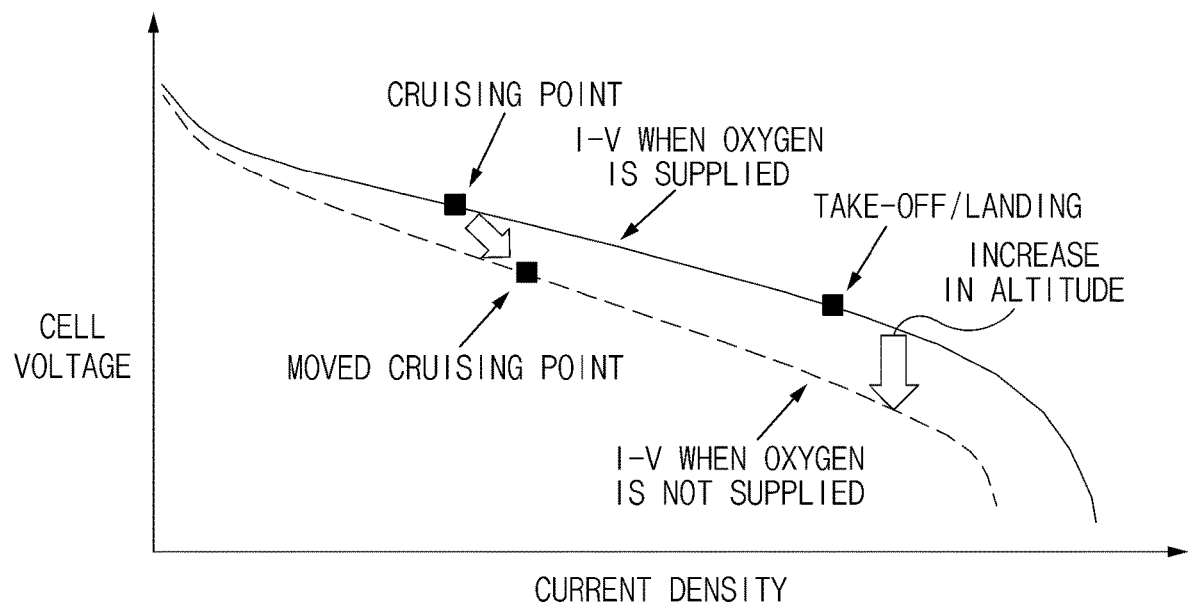
FIG. 3 is a polarization curve illustrating performance degradation of the fuel cell depending on altitude.

As shown in the polarization curve of FIG. 3, as the aircraft in flight gains height, oxygen is not smoothly supplied so that the cell voltage is decreased, and thus the performance of the fuel cell is degraded. In FIG. 3, i-v curve when oxygen is smoothly supplied before the performance of the fuel cell is degraded is shown by the solid line, and i-v curve when the performance of the fuel cell is degraded due to a deficiency in oxygen as the aircraft gains height is shown by the dotted line.

The point to which the "cruising point" representing output power required during cruising is moved depending on an increase in altitude is represented as the "moved cruising point", and the polarization curve is changed such that higher current density is required to compensate for a decrease in cell voltage. As described above, in the case of the aircraft, the output power requirement for operation varies depending on whether the aircraft is cruising, taking off, or landing. Furthermore, since the cell voltage decreases due to a deficiency in air in the surrounding atmosphere as the aircraft gains height, appropriate countermeasures for generating, by the fuel cell, output power corresponding to the output power requirement of the aircraft depending on an increase/decrease in altitude are required.

Accordingly, the aircraft monitoring device 300 may include a flight altitude determination device 310 configured to determine whether to change the oxygen supply means depending on a change in the flight altitude of the aircraft, such that compressed air is supplied to the fuel cell stack 10 by the compressor 100 when the flight altitude of the aircraft is lower than a preset reference altitude and pure oxygen stored in the small oxygen tank 200 is supplied to the fuel cell stack 10 when the flight altitude of the aircraft is higher than the reference altitude.

The flight altitude determination device 310 may include an altitude comparator 312 configured to receive the current flight altitude from an altimeter in the aircraft and compare the current flight altitude with the preset reference altitude. When the altitudes are directly compared by the altitude comparator 312, oxygen may be supplied by the compressor 100 at the specific reference altitude or less, and pure oxygen may be supplied by the small oxygen tank 200 at the reference altitude or more. Accordingly, clarity and convenience of control for changing the oxygen supply means may be improved.

Furthermore, the flight altitude determination device 310 may include a cell voltage comparator 314 configured to estimate the flight altitude of the aircraft by comparing the average of cell voltages measured by a stack voltage monitoring (SVM) device (not illustrated) in the fuel cell with a preset reference voltage. The reference voltage may be set by multiplying a cell voltage value in a reference current density state measured on the ground by the proportionality constant ($\alpha$). The proportionality constant $\alpha$ may be determined to be a value between 0 and 1.

In general, as the aircraft gains height, the cell voltage value decreases as illustrated in the polarization curve of FIG. 3, and therefore the current altitude of the aircraft may be estimated by using the current cell voltage value. Accordingly, when the average of cell voltages measured by the stack voltage monitoring device is greater than the reference voltage, the cell voltage comparator 314 may be configured to estimate that the aircraft flies at an altitude lower than the reference altitude, and when the average of cell voltages measured by the stack voltage monitoring device is less than the reference voltage, the cell voltage comparator 314 may be configured to estimate that the aircraft flies at an altitude higher than the reference altitude.

When the altitude of the aircraft is estimated by the cell voltage comparator 314, the estimation of altitude and the change of the oxygen supply means may be performed depending on the degree of actual reduction of the cell voltage causing movement of the polarization curve by lack of oxygen due to an altitude rise. Accordingly, control for changing the oxygen supply means may be performed by more accurately matching substantial performance degradation of the fuel cell.

The aircraft monitoring device 300 may further include a flight mode determination device 320 configured to determine whether the flight mode of the aircraft is a cruising mode or a taking-off/landing mode and determine whether to change the oxygen supply means depending on a change in the flight mode of the aircraft, such that when the flight mode is the cruising mode, compressed air is supplied to the fuel cell stack 10 by the compressor 100, and when the flight mode is the taking-off/landing mode, pure oxygen stored in the small oxygen tank 200 is supplied to the fuel cell stack 10.

When the flight mode is changed from the taking-off/landing mode requiring high output power during operation of the aircraft to the cruising mode requiring relatively low output power, or vice versa, the flight mode determination device 320 may allow the oxygen supply means to be automatically changed, thereby enabling stable supply of oxygen in generating output power required for operation of the aircraft from the fuel cell.

Accordingly, the flight mode determination device 320 may include an altitude change comparator 322 configured to calculate an altitude change of the aircraft for a predetermined reference period of time, compare the absolute value of the calculated altitude change with a preset reference altitude change, determine that the aircraft is in the cruising mode when the absolute value of the calculated altitude change is smaller than the reference altitude change, and determine that the aircraft is in the taking-off/landing mode when the absolute value of the calculated altitude change is greater than the reference altitude change. In other words, since the change in the altitude of the aircraft cruising is minimal, but the change in the altitude of the aircraft taking off or landing is substantial, the altitude change comparator 322 may be configured to determine the flight mode by comparing the change in the flight altitude of the aircraft obtained from the altimeter with the preset reference altitude change.

Figure 4A:
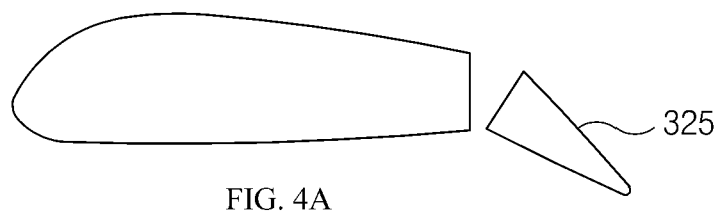
FIGS. 4A-4B are views illustrating determination of a flight mode of the aircraft by a wing shape depending on the angle and position of a flap according to the present disclosure.
Figure 4B:

The flight mode determination device 320 may further include a wing shape determination device 324 configured to determine that the aircraft is in the cruising mode when flaps of wings of the aircraft are in a neutral state and determine that the aircraft is in the taking-off/landing mode when the flaps of the wings of the aircraft are in a flat state. Accordingly, the wing shape determination device 324 may be configured to obtain information about the angles and positions of the flaps, determine that the aircraft is in the cruising mode when the flaps 325 of the wings are in a neutral state as illustrated in FIG. 4A, and determine that the aircraft is in the taking-off/landing mode when the flaps 325 of the wings are in a flat state as illustrated in FIG. 4B.

The aircraft monitoring device 300 may further include an output power comparator 330 configured to compare the output power requirement that has to be generated in the fuel cell for operation of the aircraft with preset reference output power and determine whether to change the oxygen supply means depending on a change in the output power requirement that has to be generated in the fuel cell, to supply compressed air to the fuel cell stack 10 by the compressor 100 when the output power requirement is less than the reference output power and pure oxygen stored in the small oxygen tank 200 is supplied to the fuel cell stack 10 when the output power requirement is greater than the reference output power.

As the magnitude of the output power requirement that has to be generated in the fuel cell increases or decreases depending on a control command of a controller provided for operation of the aircraft, the supply of compressed air using the compressor 100 and the supply of pure oxygen from the small oxygen tank 200 may be automatically switched, and appropriate oxygen supply may be performed. The aircraft monitoring device 300 may include at least one of the flight altitude determination device 310, the flight mode determination device 320, or the output power comparator 330. Accordingly, a change of the oxygen supply means may depend on one of a flight altitude change, a flight mode change, or an output power requirement increase/decrease.

When the flight mode is changed from the taking-off/landing mode to the cruising mode during operation of the aircraft, it may be necessary to change the oxygen supply means, and even while the aircraft flies in the same cruising mode, it may be necessary to change the oxygen supply means depending on an increase/decrease in the altitude of the aircraft. Accordingly, the aircraft monitoring device 300 including the flight altitude determination device 310 and the flight mode determination device 320 may enable a change of the oxygen supply means depending on various operation situations of the aircraft.

The oxygen supply means switching device 400 may be configured to control ON/OFF of the compressor 100, ON/OFF of the pressure adjustment device 220, and opening/closing of the compressed-air air supply valve 110 and the pure oxygen supply valve 210 to change the oxygen supply means for the fuel cell stack 10 depending on a determination result of the aircraft monitoring device 300. Accordingly, the oxygen supply means switching device 400 may include a valve switching controller 410 configured to execute selective opening/closing of the compressed-air supply valve 110, which is provided at the output end from which compressed air generated by the compressor 100 is supplied, and the pure oxygen supply valve 210, which is provided at the output end from which pure oxygen stored in the small oxygen tank 200 is supplied, depending on the determination result of the aircraft monitoring device 300.

The valve switching controller 410 may be configured to perform control depending on the determination result of the aircraft monitoring device 300 such that the pure oxygen supply valve 210 is shut off when the compressed-air supply valve 110 is open and the compressed-air supply valve 110 is shut off when the pure oxygen supply valve 210 is open. Accordingly, the valve switching controller 410 may be configured to switch the oxygen supply means for the fuel cell stack 10 by opening one of the compressed-air supply valve 110 and the pure oxygen supply valve 210 and closing the remaining valve. At this time, both the compressed-air supply valve 110 and the pure oxygen supply valve 210 may be open, and description thereabout will be given in another embodiment of the present disclosure to be described below.

Figure 6:
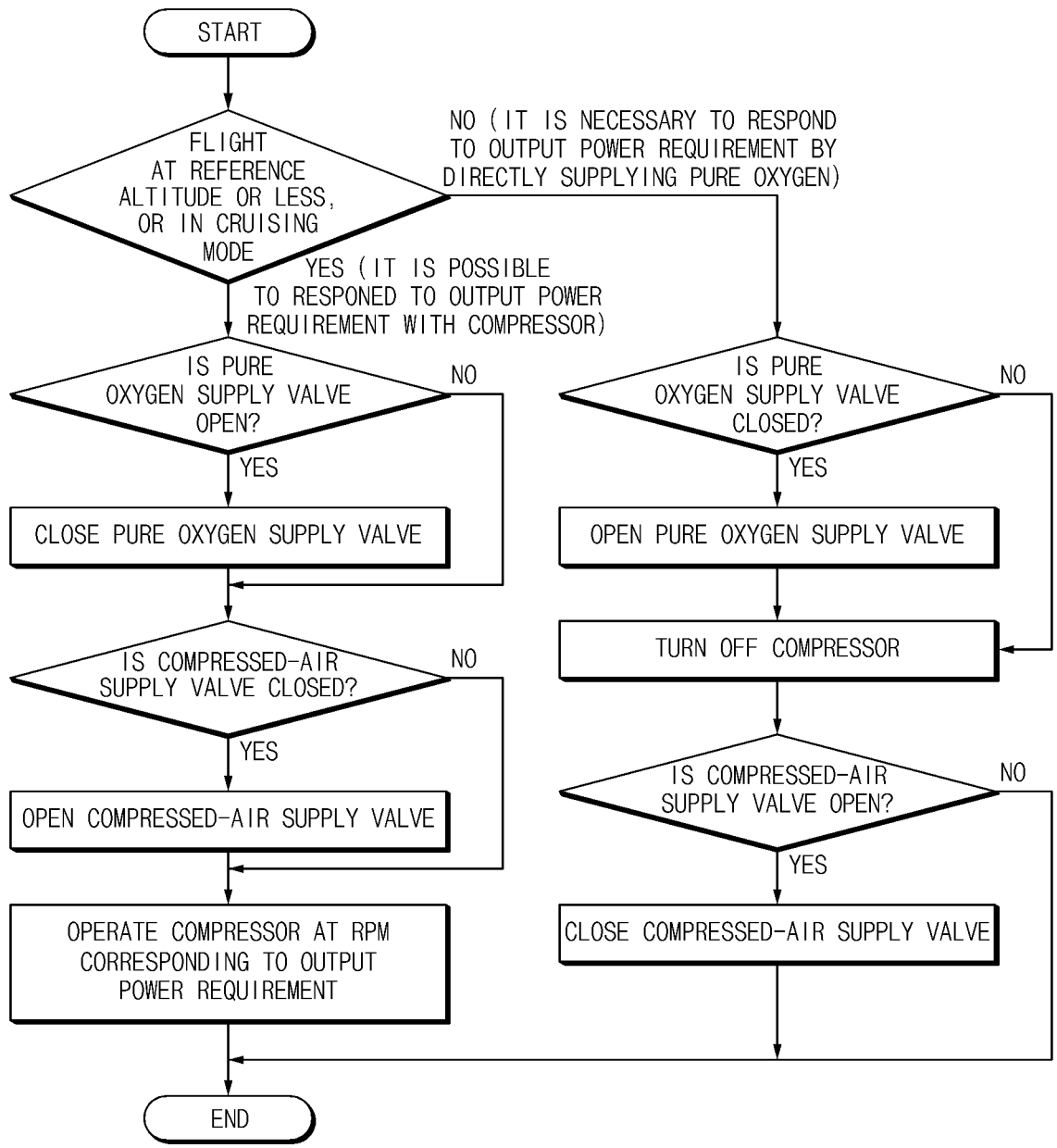
FIG. 6 is a flowchart illustrating a control algorithm for changing the oxygen supply means depending on a change in the altitude or flight mode of the aircraft according to the present disclosure.

As in the control algorithm illustrated in FIG. 6, when the flight altitude determination device 310 determines that the aircraft flies at the reference altitude or less or the flight mode determination device 320 determines that the aircraft flies in the cruising mode, the valve switching controller 410 may be configured to recognize that the compressor 100 alone is able to respond to the output power requirement of the aircraft and determine whether the pure oxygen supply valve 210 is open. In response to determining that the pure oxygen supply valve 210 is open, the valve switching controller 410 may be configured to close the pure oxygen supply valve 210 to stop the supply of pure oxygen to the fuel cell stack 10.

The valve switching controller 410 may be configured to determine whether the compressed-air supply valve 110 is closed. In response to determining that the compressed-air supply valve 110 is closed, the valve switching controller 410 may be configured to open the compressed-air supply valve 110 to allow for the supply of compressed air to the fuel cell stack 10. At this time, to increase oxygen partial pressure to a level in which the output power requirement required by a drive device of the aircraft is implemented, the compressor 100 may be configured to operate at a constant RPM to generate compressed air and supply the compressed air to the fuel cell stack 10.

When the flight altitude determination device 310 determines that the aircraft flies at the reference altitude or more or the flight mode determination device 320 determines that the aircraft flies in the taking-off/landing mode, the valve switching controller 410 may be configured to recognize that direct supply of pure oxygen is able to respond to the output power requirement of the aircraft and determine whether the pure oxygen supply valve 210 is closed. In response to determining that the pure oxygen supply valve 210 is closed, the valve switching controller 410 may be configured to open the pure oxygen supply valve 210 and turn off the compressor 100 to stop generating the compressed air. The valve switching controller 410 may be configured to determine whether the compressed-air supply valve 110 is open. In response to determining that the compressed-air supply valve 110 is open, the valve switching controller 410 may be configured to close the compressed-air supply valve 110 and directly supply pure oxygen from the small oxygen tank 200 to the fuel cell stack 10.

Figure 7:
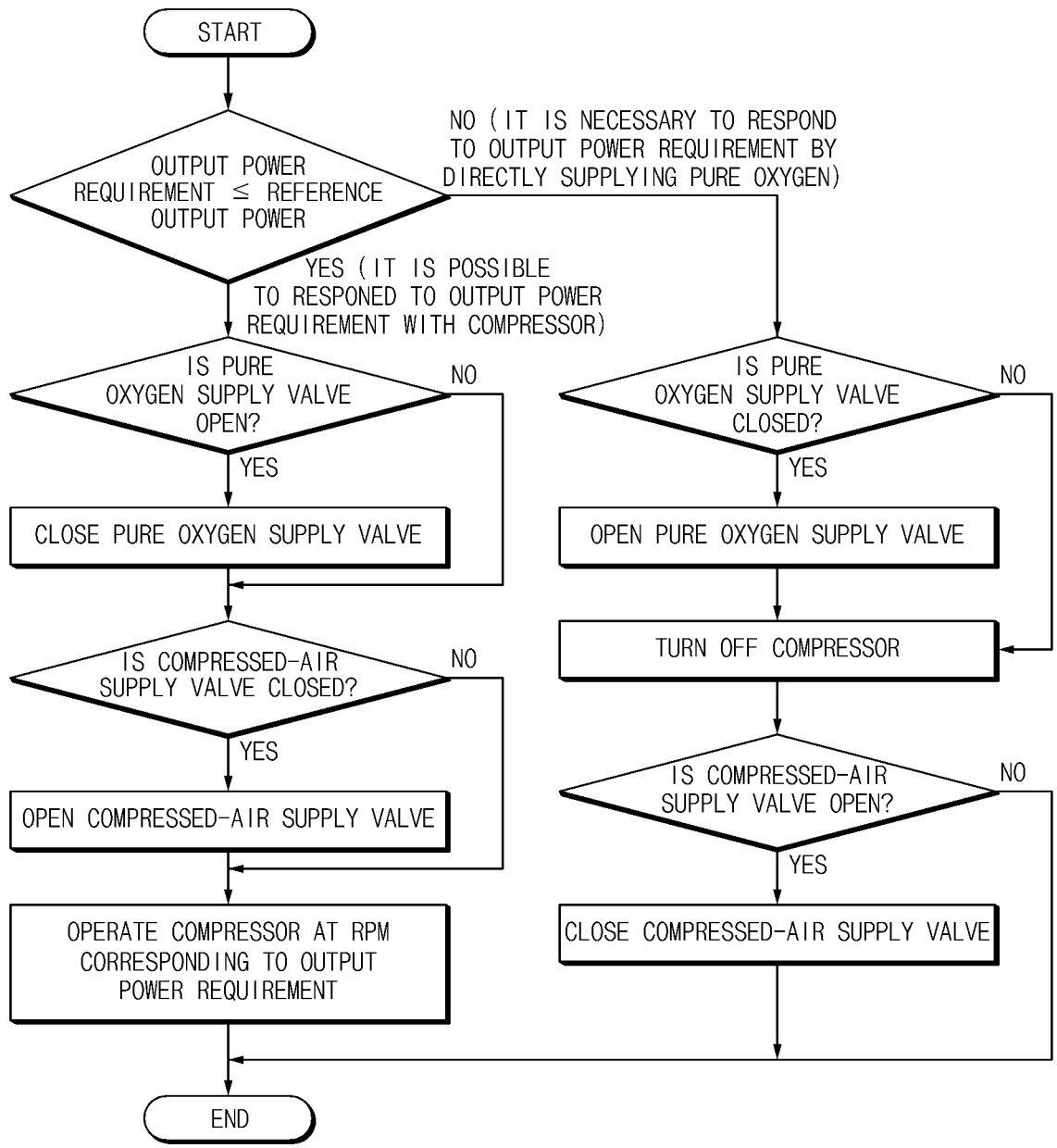
FIG. 7 is a flowchart illustrating a control algorithm for changing the oxygen supply means depending on a change in the output power requirement of the aircraft according to the present disclosure.

As in the control algorithm illustrated in FIG. 7, in the case where the aircraft monitoring device 300 includes the output power comparator 330, when the output power requirement is less than the reference output power, the valve switching controller 410 may be configured to recognize that the compressor 100 alone is able to respond to the output power requirement of the aircraft and determine whether the pure oxygen supply valve 210 is open. In response to determining that the pure oxygen supply valve 210 is open, the valve switching controller 410 may be configured to close the pure oxygen supply valve 210 to stop the supply of pure oxygen to the fuel cell stack 10. Thereafter, as in the control algorithm of FIG. 6, the valve switching controller 410 may be configured to open the compressed-air supply valve 110 and operate the compressor 100 to generate compressed air and supply the compressed air to the fuel cell stack 10.

When the output power comparator 330 determines that the output power requirement is greater than the reference output power, the valve switching controller 410 is configured to recognize that direct supply of pure oxygen is able to respond to the output power requirement of the aircraft and determine whether the pure oxygen supply valve 210 is closed. In response to determining that the pure oxygen supply valve 210 is closed, the valve switching controller 410 may be configured to open the pure oxygen supply valve 210, turn off the compressor 100, closes the compressed-air supply valve 110, and directly supply pure oxygen from the small oxygen tank 200 to the fuel cell stack 10.

The oxygen supply means switching device 400 may further include a compressor OFF controller 420 configured to change the oxygen supply means for the fuel cell stack 10 by turning off the compressor 100 while opening the pure oxygen supply valve 210, which is provided at the output end from which pure oxygen stored in the small oxygen tank 200 is supplied, or by closing the pure oxygen supply valve 210 while turning on the compressor 100, depending on a determination result of the aircraft monitoring device 300.

Figure 8:
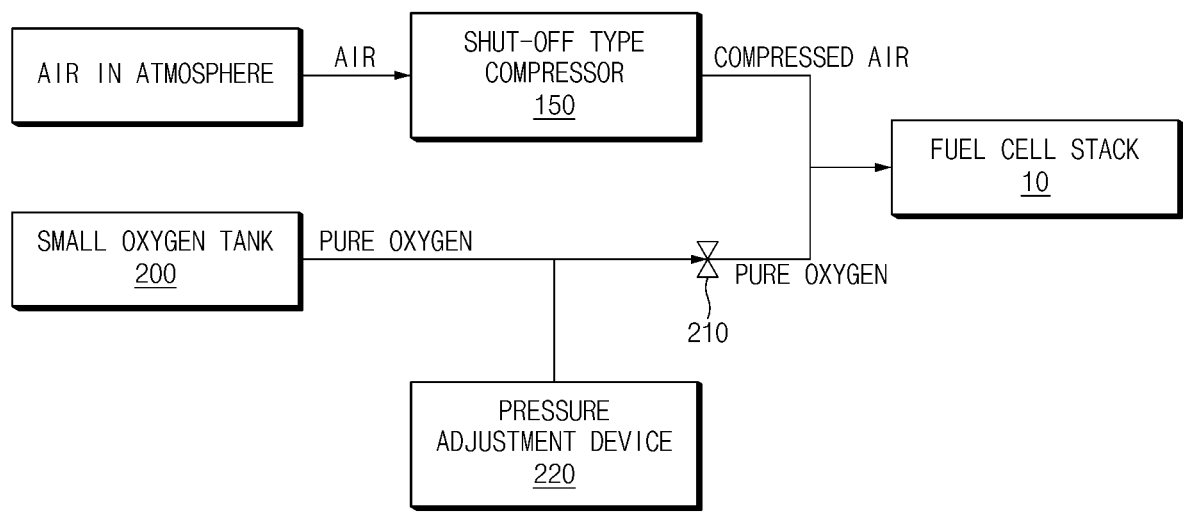
FIG. 8 is a block diagram illustrating a connecting structure capable of changing the oxygen supply means by OFF control of a compressor according to the present disclosure.

Accordingly, the compressor 100 has to be implemented with the shut-off type compressor 150 that, when turned off, is capable of automatically closing a path along which air is movable. When the shut-off type compressor 150 is provided, as illustrated in FIG. 8, an output end of the shut-off type compressor 150 may be directly connected to the fuel cell stack 10 without a separate supply valve, and the pure oxygen supply valve 210 may be provided on only the path extending from the small oxygen tank 200 to the fuel cell stack 10.

Accordingly, when the supply path of compressed air is automatically closed while the shut-off type compressor 150 is turned off by the compressor OFF controller 420, the pure oxygen supply valve 210 may be open, and pure oxygen may be supplied from only the small oxygen tank 200. When the shut-off type compressor 150 is turned on and the supply path of compressed air is open, the pure oxygen supply valve 210 may be closed, and compressed air may be supplied from only the compressor 100. Accordingly, the oxygen supply means may be selectively changed.

Figure 9:
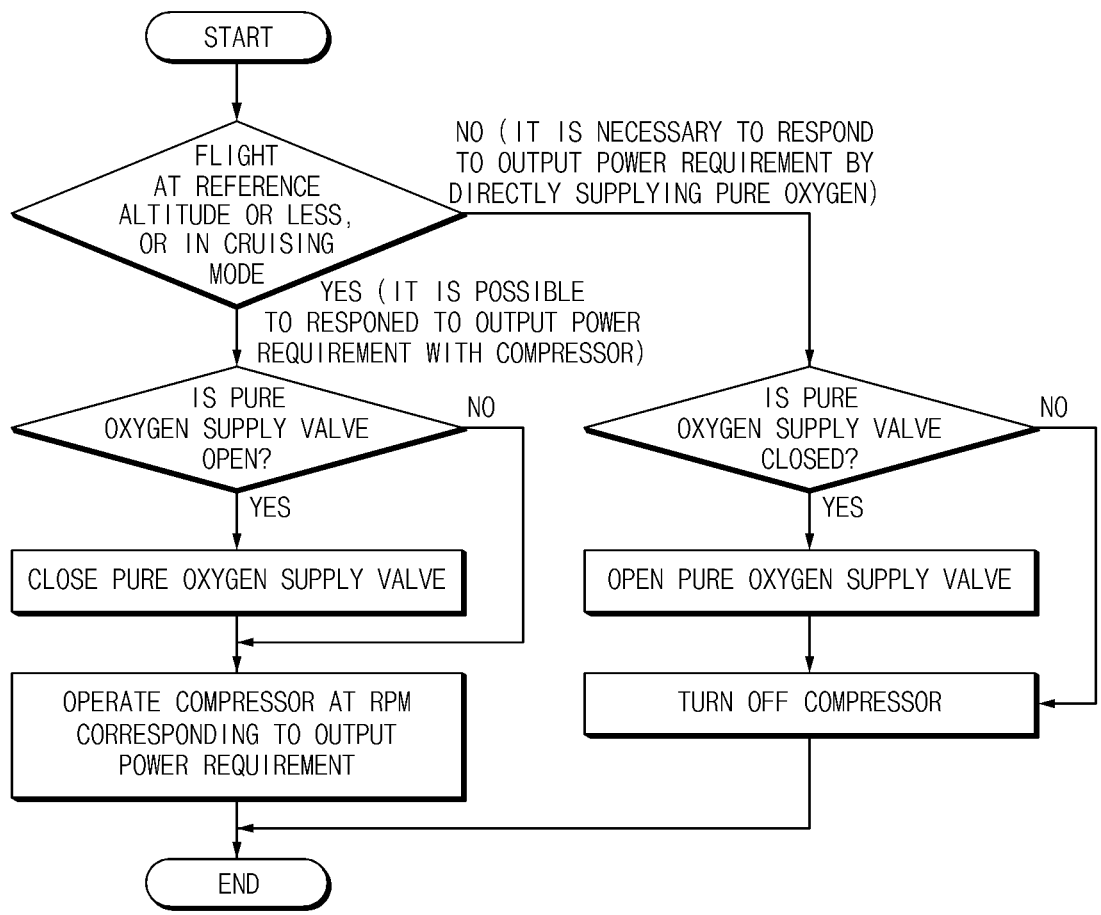
FIG. 9 is a flowchart illustrating a control algorithm for turning off the compressor and changing the oxygen supply means depending on a change in the altitude or flight mode of the aircraft according to the present disclosure.

As in the control algorithm illustrated in FIG. 9, when the flight altitude determination device 310 determines that the aircraft flies at the reference altitude or less or the flight mode determination device 320 determines that the aircraft flies in the cruising mode, the compressor OFF controller 420 may be configured to recognize that the shut-off type compressor alone is able to respond to the output power requirement of the aircraft and determine whether the pure oxygen supply valve 210 is open. In response to determining that the pure oxygen supply valve 210 is open, the pure oxygen supply valve 210 may be closed to stop the supply of pure oxygen to the fuel cell stack 10. The shut-off type compressor 150 is turned on to generate compressed air and supply the compressed air to the fuel cell stack 10. While the shut-off type compressor 150 is turned on, the path reaching the fuel cell stack 10 is automatically open, and the compressed air is able to be supplied.

When the flight altitude determination device 310 determines that the aircraft flies at the reference altitude or more or the flight mode determination device 320 determines that the aircraft flies in the taking-off/landing mode, the compressor OFF controller 420 may be configured to recognize that direct supply of pure oxygen is able to respond to the output power requirement of the aircraft and determine whether the pure oxygen supply valve 210 is closed. In response to determining that the pure oxygen supply valve 210 is closed, the shut-off type compressor 150 may be turned off, and the pure oxygen supply valve 210 may be open to supply pure oxygen from the small oxygen tank 200 to the fuel cell stack 10.

At this time, the path connected to the output end of the shut-off type compressor is closed while the shut-off type compressor is turned off. Accordingly, even though a separate compressed-air supply valve is not provided, the pure oxygen may be supplied from the small oxygen tank 200 to the fuel cell stack 10 without being leaked toward the shut-off type compressor.

Figure 10:
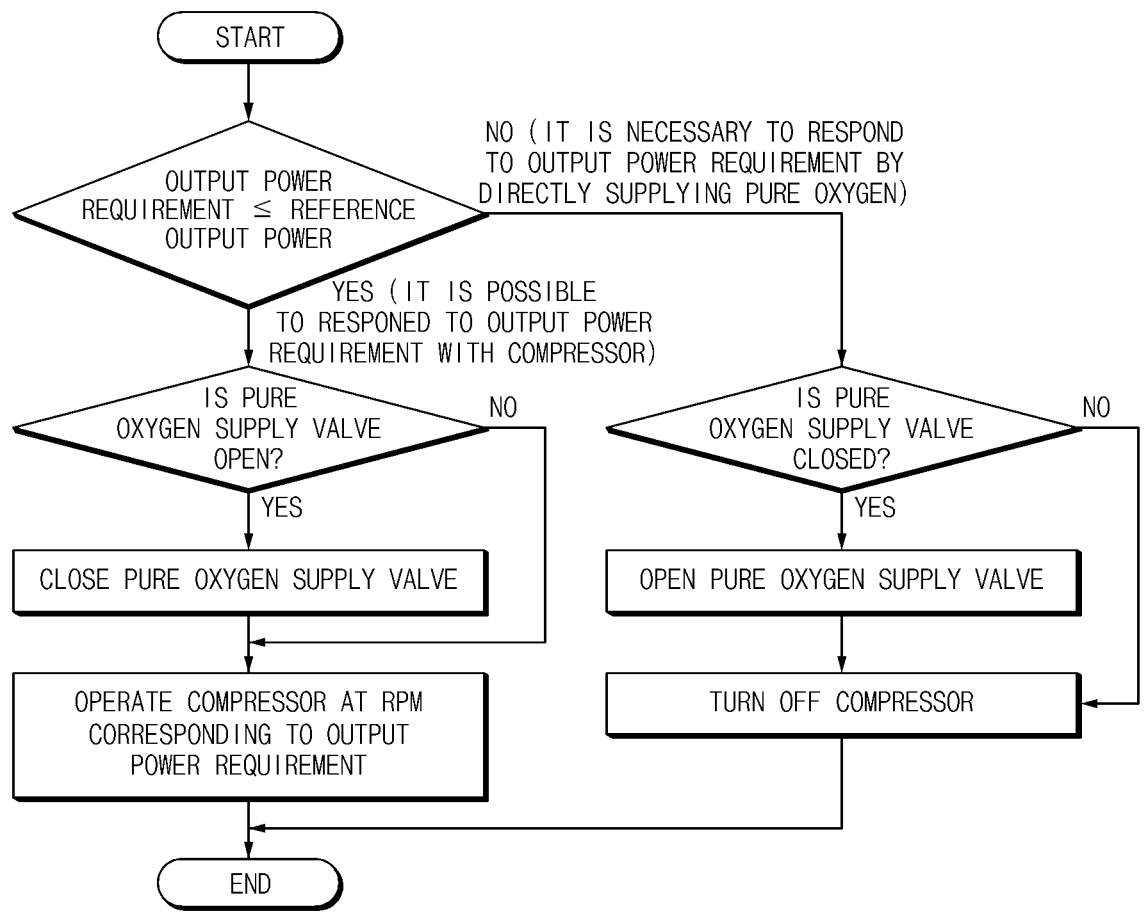
FIG. 10 is a flowchart illustrating a control algorithm for turning off the compressor and changing the oxygen supply means depending on a change in the output power requirement of the aircraft according to the present disclosure.

As in the control algorithm illustrated in FIG. 10, in the case where the aircraft monitoring device 300 includes the output power comparator 330, when the output power requirement is less than the reference output power, the compressor OFF controller 420 may be configured to recognize that the compressor 100 alone is able to respond to the output power requirement of the aircraft and determine whether the pure oxygen supply valve 210 is open. In response to determining that the pure oxygen supply valve 210 is open, the pure oxygen supply valve 210 may be closed to stop the supply of pure oxygen to the fuel cell stack 10. Thereafter, as in the control algorithm of FIG. 9, the shut-off type compressor may be configured to generate compressed air and supply the compressed air to the fuel cell stack 10.

When the output power comparator 330 determines that the output power requirement is greater than the reference output power, the compressor OFF controller 420 may be configured to determine that direct supply of pure oxygen is able to respond to the output power requirement of the aircraft and determine whether the pure oxygen supply valve 210 is closed. In response to determining that the pure oxygen supply valve 210 is closed, the pure oxygen supply valve 210 may be open, the shut-off type compressor 150 may be turned off, and pure oxygen may be supplied from the small oxygen tank 200 to the fuel cell stack 10. At this time, as described above, the path connected to the output end of the shut-off type compressor is closed while the shut-off type compressor is turned off.

As described above, only when it is difficult to generate required output power with only compressed air depending on the flight altitude or flight mode of the aircraft or an increase/decrease in the output power requirement, pure oxygen may be supplied to the fuel cell stack 10, and when not, compressed air generated by compressing the atmosphere around the aircraft may be supplied to the fuel cell stack 10 to generate power. Accordingly, a total amount of pure oxygen required during operation of the aircraft may be reduced. Due to this, the weight and volume of the entire fuel cell system provided in the aircraft may be reduced. As a result, the time of flight of the aircraft may be increased, and fuel economy may be improved.

Figure 11:
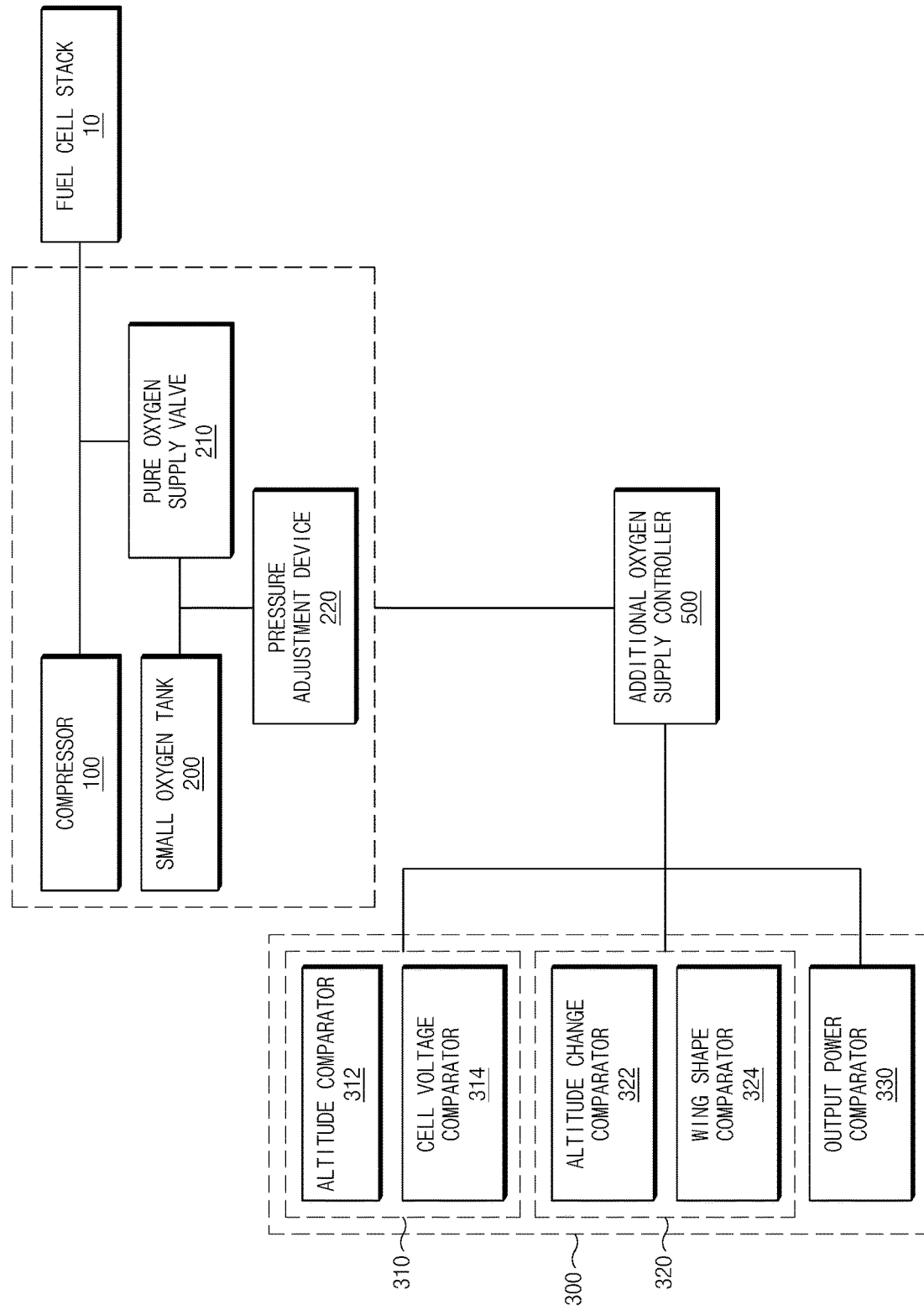
FIG. 11 is a block diagram illustrating a connecting structure capable of additionally supplying oxygen to a fuel cell stack according to another embodiment of the present disclosure.

As illustrated in FIG. 11, an oxygen supply apparatus for a fuel cell of an aircraft according to another embodiment of the present disclosure may include an additional oxygen supply controller 500 for supplementing lack of oxygen with pure oxygen rather than selectively directly supplying compressed air supplied from the compressor 100 and pure oxygen supplied from the small oxygen tank 200 to the fuel cell stack 10.

Accordingly, a supply path of pure oxygen stored in the small oxygen tank 200 may be connected to a supply path of compressed air that extends from the compressor 100 to the fuel cell stack 10, and the pure oxygen supply valve 210 configured to adjust whether to additionally supply the pure oxygen may be provided. The additional oxygen supply controller 500 may be configured to adjust whether to open or close the pure oxygen supply valve 210, depending on a determination result of the aircraft monitoring device 300 and may be configured to perform control such that oxygen supplied to the fuel cell stack 10 is compressed air or a mixture of compressed air and pure oxygen.

Figure 5:
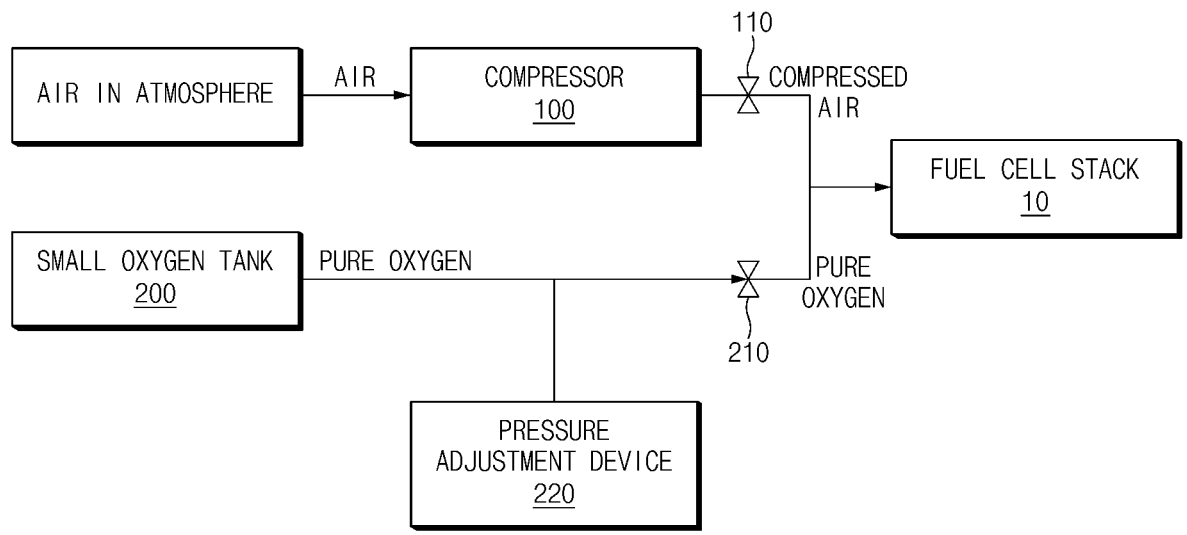
FIG. 5 is a block diagram illustrating a connecting structure in which valves provided in an oxygen supply means for a fuel cell stack are selectively opened and closed according to an embodiment of the present disclosure.

In other words, as illustrated in FIGS. 5 and 8, a path along which pure oxygen stored in the small oxygen tank 200 is directly supplied to the fuel cell stack 10 may be formed, and opening/closing of the pure oxygen supply valve 210 provided on the path may be adjusted. Accordingly, unlike the oxygen supply means switching device 400 that controls whether to directly supply pure oxygen to the fuel cell stack 10, the additional oxygen supply controller 500 may be configured to consistently maintain the supply of compressed air from the compressor 100 to the fuel cell stack 10 and may be configured to additionally supply a predetermined amount of pure oxygen to the path along which compressed air is supplied, only when the determination result of the aircraft monitoring device 300 shows that required output power is difficult to generate with only oxygen of compressed air due to the high output power requirement of the aircraft and the high altitude thereof. As described above, oxygen may be supplied to the fuel cell stack 10 in a state in which compressed air and pure oxygen are mixed, and thus sufficient oxygen for generation of required output power in the fuel cell stack 10 may be supplied.

Figure 12:
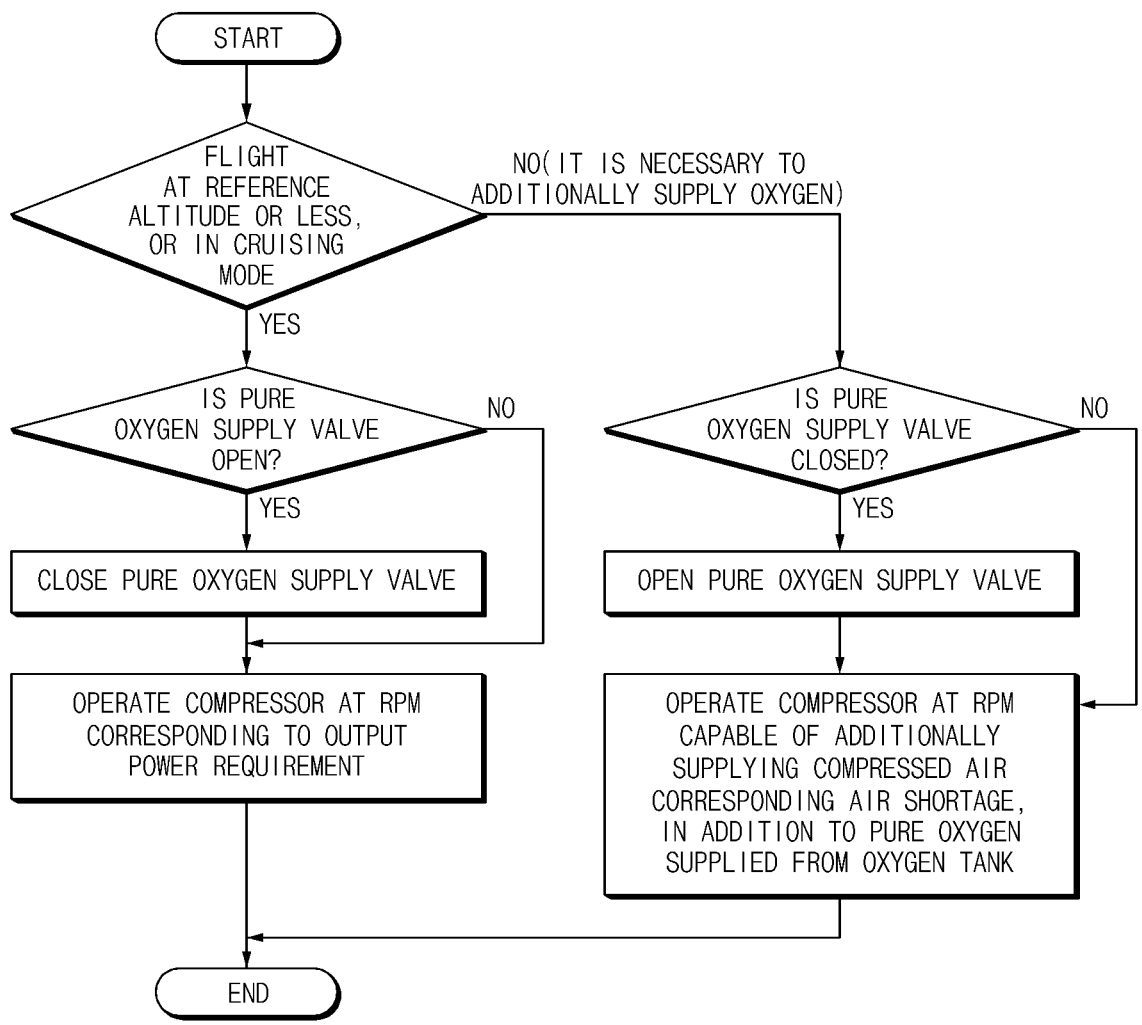
FIG. 12 is a flowchart illustrating a control algorithm for additionally supplying oxygen depending on a change in the altitude or flight mode of an aircraft according to another embodiment of the present disclosure.

As in the control algorithm illustrated in FIG. 12, when the flight altitude determination device 310 or the flight mode determination device 320 determines that the aircraft flies at the reference altitude or less or the aircraft flies in the cruising mode, the additional oxygen supply controller 500 may be configured to recognize that compressed air alone is able to respond to the output power requirement of the aircraft and determine whether the pure oxygen supply valve 210 is open. In response to determining that the pure oxygen supply valve 210 is open, the additional oxygen supply controller 500 may be configured to close the pure oxygen supply valve 210 to stop mixture of compressed air and pure oxygen and supply, to the fuel cell stack 10, only compressed air generated by the compressor 100.

Furthermore, when the flight altitude determination device 310 or the flight mode determination device 320 determines that the aircraft flies at the reference altitude or more or the aircraft flies in the taking-off/landing mode, the additional oxygen supply controller 500 may be configured to recognize that additional supply of pure oxygen is able to respond to the output power requirement of the aircraft and determine whether the pure oxygen supply valve 210 is closed. In response to determining that the pure oxygen supply valve 210 is closed, the additional oxygen supply controller 500 may be configured to supply, to the fuel cell stack 10, air in which compressed air and pure oxygen are mixed, by opening the pure oxygen supply valve 210 and additionally supply pure oxygen stored in the small oxygen tank 200 to the path along which compressed air is supplied.

When the compressed air and the pure oxygen are supplied in the mixed form to the fuel cell stack 10 as described above, the additional oxygen supply controller 500 may be configured to adjust the rpm of the compressor 100 to supply compressed air corresponding to an air shortage, in addition to pure oxygen supplied from the small oxygen tank 200.

Figure 13:
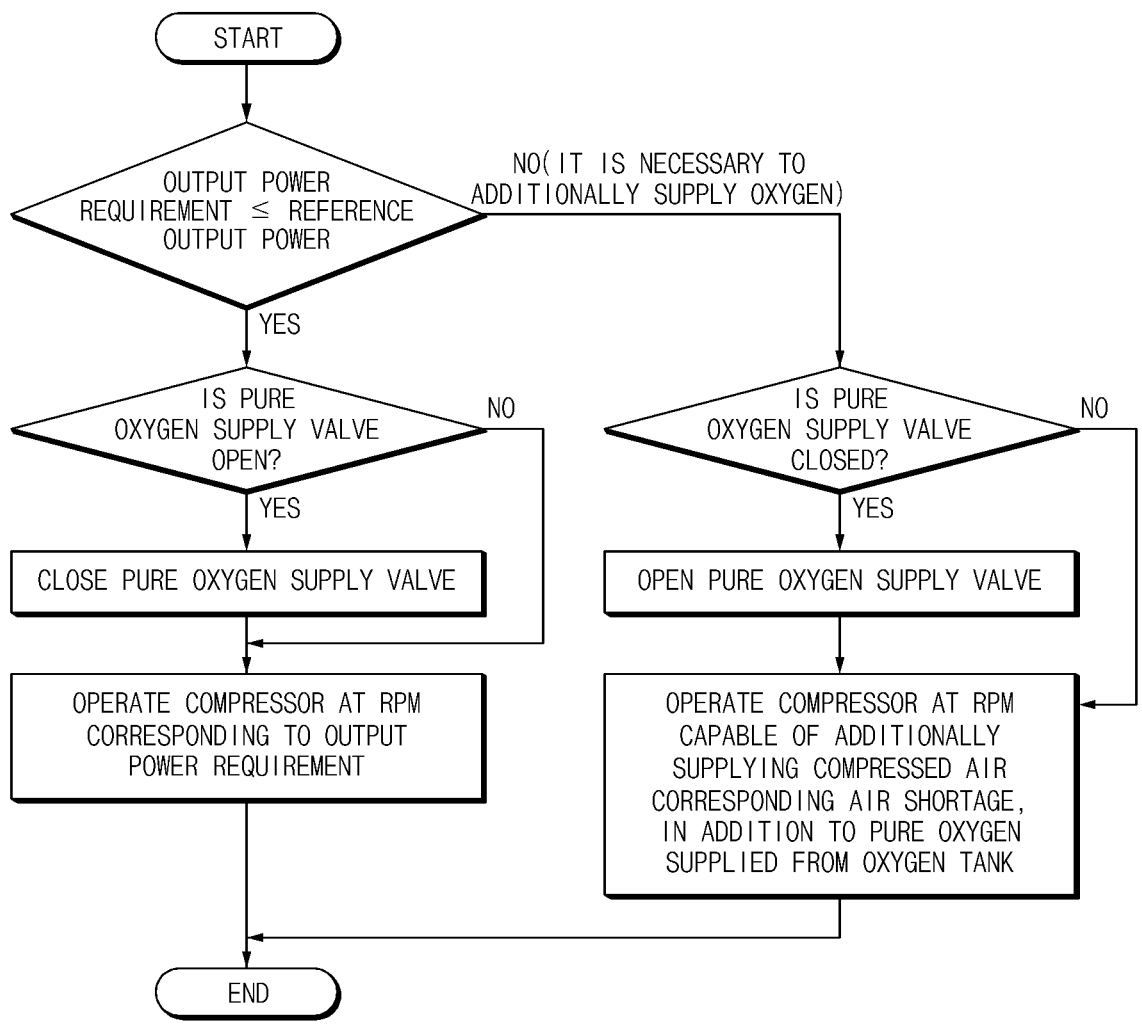
FIG. 13 is a flowchart illustrating a control algorithm for additionally supplying oxygen depending on a change in the output power requirement of an aircraft according to another embodiment of the present disclosure.

As in the control algorithm illustrated in FIG. 13, in the case where the aircraft monitoring device 300 includes the output power comparator 330, when the output power requirement is less than the reference output power, the additional oxygen supply controller 500 may be configured to recognize that the compressor 100 alone is able to respond to the output power requirement of the aircraft and determines whether the pure oxygen supply valve 210 is open. In response to determining that the pure oxygen supply valve 210 is open, the additional oxygen supply controller 500 may be configured to close the pure oxygen supply valve 210 to stop mixture of compressed air and pure oxygen. As in the control algorithm of FIG. 12, only the compressed air generated by the compressor 100 is supplied to the fuel cell stack 10.

When the output power comparator 330 determines that the output power requirement is greater than the reference output power, the additional oxygen supply controller 500 may be configured to recognize that additional supply of pure oxygen is able to respond to the output power requirement of the aircraft and determine whether the pure oxygen supply valve 210 is closed. In response to determining that the pure oxygen supply valve 210 is closed, the additional oxygen supply controller 500 may be configured to open the pure oxygen supply valve 210 to additionally supply pure oxygen stored in the small oxygen tank 200 to the path along which the compressed air is supplied. Accordingly, air in which compressed air and pure oxygen are mixed may be supplied to the fuel cell stack 10, and thus sufficient oxygen for generation of high output power may be supplied.

As described above, compressed air generated by compressing the atmosphere around the aircraft may be employed as a consistent oxygen supply means for the fuel cell stack 10, and pure oxygen stored in the small oxygen tank 200 may be supplied in a form mixed with the compressed air only when the aircraft is in the taking-off/landing mode or flies at an altitude higher than the reference altitude. Accordingly, an amount of required pure oxygen may be reduced, and an increase in the volume and weight of the fuel cell system due to the oxygen tank may be minimized.

Furthermore, lack of oxygen required to generate high output power may be supplemented with pure oxygen additionally supplied from the small oxygen tank 200. Accordingly, it is not necessary to increase the volume and performance of the compressor 100 to implement a high compression ratio, and thus an increase in the weight of the fuel cell system may be minimized. Moreover, pure oxygen additionally supplied from the small oxygen tank 200 may be mixed with compressed air and supplied to the fuel cell stack 10. Accordingly, i-v performance of the fuel cell may be improved by increasing oxygen partial pressure, and thus net power may be increased to improve fuel economy of the aircraft.

Figure 14:
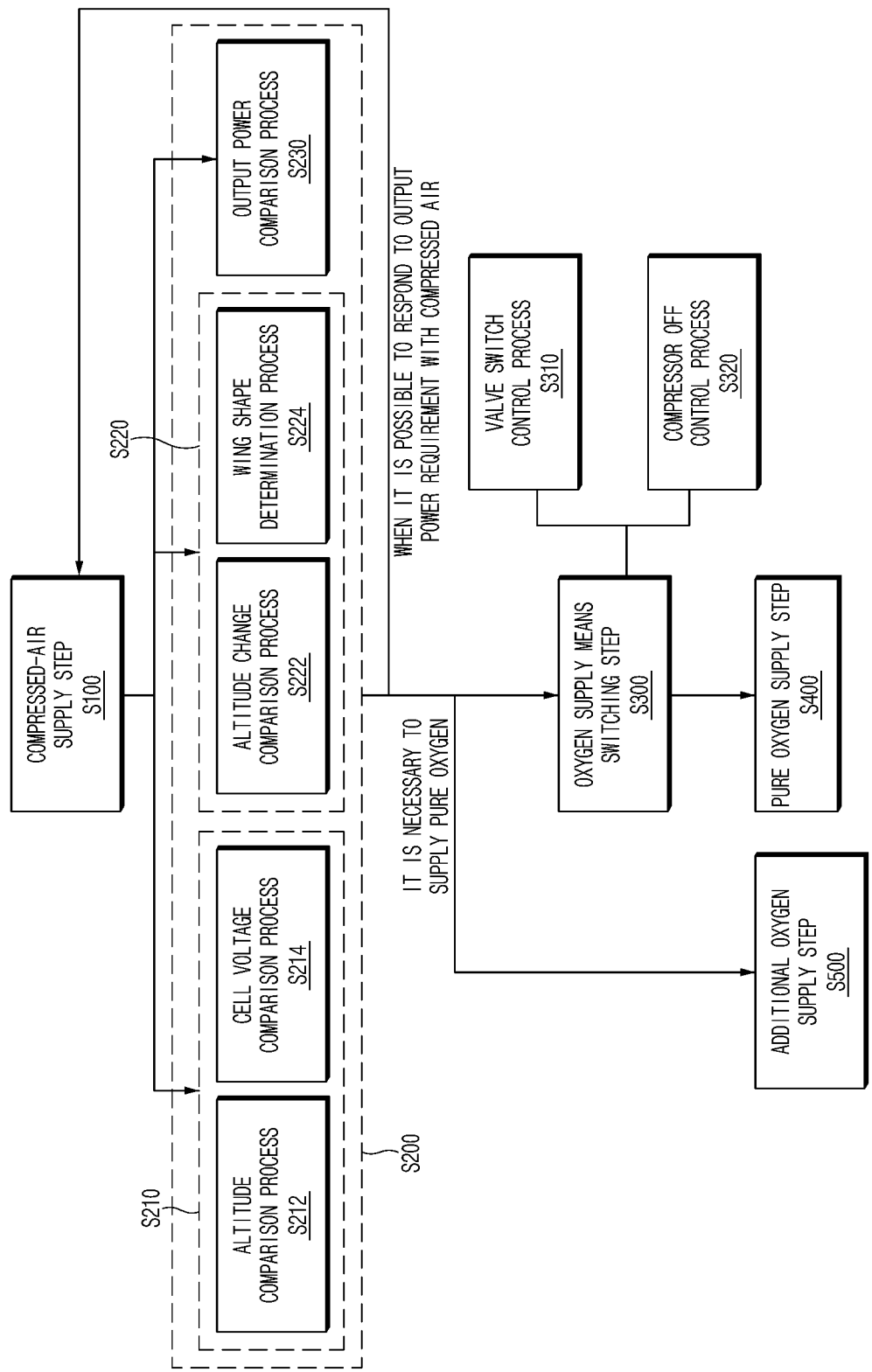
FIG. 14 is a block diagram illustrating an oxygen supply method for a fuel cell of an aircraft according to another embodiment of the present disclosure.

Hereinafter, an oxygen supply method for a fuel cell of an aircraft according to another embodiment of the present disclosure will be described with reference to FIG. 14. FIG. 14 is a block diagram illustrating the oxygen supply method for the fuel cell of the aircraft according to the other embodiment of the present disclosure.

Referring to FIG. 14, the oxygen supply method for the fuel cell of the aircraft according to the other embodiment of the present disclosure may include a compressed-air supply step S100 of compressing, by the compressor 100, air in the atmosphere to generate compressed air and supplying the compressed air to the fuel cell stack 10, an aircraft monitoring step S200 of monitoring the aircraft in flight to determine whether the compressed air supplied from the compressor 100 is able to respond to the output power requirement of the aircraft or whether the supply of pure oxygen from the small oxygen tank 200 is required, an oxygen supply means switching step S300 of switching an oxygen supply means for the fuel cell stack 10 from the compressor 100 to the small oxygen tank 200, or vice versa depending on an outcome of the monitoring, and a pure oxygen supply step S400 of supplying pure oxygen stored in the small oxygen tank 200 to the fuel cell stack 10 when the oxygen supply means is switched to the small oxygen tank 200.

Instead of supplying oxygen to the fuel cell stack 10 using a single oxygen supply means in the entire section in which the aircraft flies, the present disclosure may include the compressor 100 and the small oxygen tank 200 as oxygen supply means, configured to supply compressed air to the fuel cell stack 10 when it is possible to respond to the output power requirement of the aircraft with only the compressed air generated by the compressor 100, and supply pure oxygen to the fuel cell stack 10 when it is difficult to respond to the output power requirement of the aircraft with only the compressed air. Accordingly, the present disclosure may prevent implementation of an excessive compression ratio in the compressor 100, thereby preventing power loss and may minimize the capacity of pure oxygen that has to be stored in the oxygen tank, thereby reducing an increase in volume and weight.

First, in the compressed-air supply step S100, to perform an oxidation/reduction reaction that generates electrical energy using hydrogen fuel, air in the atmosphere may be suctioned and compressed, and the compressed air may be supplied to the fuel cell stack 10. The supply of compressed air by the compressor 100 may be employed as a main oxygen supply means, and thus an increase in the storage capacity of pure oxygen that has to be stored for use when high output power greater than the reference output power is required or when the aircraft flies at an altitude higher than the reference altitude may be minimized.

In the aircraft monitoring step S200, the aircraft monitoring device 300 may be configured to determine whether the aircraft is in a situation in which high output power requiring stable supply of pure oxygen is required or a situation in which it is possible to respond to the output power requirement with only the supply of compressed air by the compressor 100, based on a change in the altitude of the aircraft in flight, the current flight mode, or a change in the output power requirement.

Accordingly, the aircraft monitoring step S200 may include a flight altitude determination process S210 of determining whether to change the oxygen supply means depending on a change in the flight altitude of the aircraft, such that compressed air is supplied to the fuel cell stack 10 by the compressor 100 when the flight altitude of the aircraft is lower than the preset reference altitude and pure oxygen stored in the small oxygen tank 200 is supplied to the fuel cell stack 10 when the flight altitude of the aircraft is higher than the reference altitude.

The flight altitude determination process S210 may include an altitude comparison process S212 of receiving the current flight altitude from an altimeter in the aircraft, comparing the current flight altitude with the reference altitude, and determining whether to change the oxygen supply means depending on a change in the altitude of the aircraft. The flight altitude determination process S210 may include a cell voltage comparison process S214 of determining whether to change the oxygen supply means depending on a change in the altitude of the aircraft, by estimating the flight altitude of the aircraft by comparing the average of cell voltages measured by the stack voltage monitoring (SVM) device in the fuel cell with the preset reference voltage.

In the cell voltage comparison process S214, when the average of cell voltages measured by the stack voltage monitoring device is greater than the reference voltage, the cell voltage comparator 314 may be configured to estimate that the aircraft flies at an altitude lower than the reference altitude, and when the average of cell voltages measured by the stack voltage monitoring device is less than the reference voltage, the cell voltage comparator 314 may be configured to estimate that the aircraft flies at an altitude higher than the reference altitude.

When the altitude of the aircraft is estimated by the cell voltage comparison process S214, the estimation of altitude and the change of the oxygen supply means may be performed depending on the degree of actual reduction of the cell voltage causing movement of the polarization curve by a deficiency in oxygen due to an altitude rise. Accordingly, control for changing the oxygen supply means may be performed by more accurately matching substantial performance degradation of the fuel cell. In other words, changing the oxygen supply means depending on an increase in the altitude of the aircraft is for preventing deterioration in an oxidation/reduction reaction in the fuel cell stack 10 due to lack of oxygen. Accordingly, when the oxygen supply means is changed based on a cell voltage change caused by the deterioration in the oxidation/reduction reaction, the oxygen supply means may be changed at a more accurate time point.

The aircraft monitoring step S200 may further include a flight mode determination process S220 of determining whether the flight mode of the aircraft is a cruising mode or a taking-off/landing mode and determining whether to change the oxygen supply means depending on a change in the flight mode of the aircraft, such that when the flight mode is the cruising mode, compressed air is supplied to the fuel cell stack 10 by the compressor 100, and when the flight mode is the taking-off/landing mode, pure oxygen stored in the small oxygen tank 200 is supplied to the fuel cell stack 10.

In the flight mode determination process S220, when the flight mode is changed from the taking-off/landing mode requiring high output power during operation of the aircraft to the cruising mode requiring relatively low output power, or vice versa, the flight mode determination device 320 may allow the oxygen supply means to be automatically changed, thereby enabling stable supply of oxygen in generating output power required for operation of the aircraft from the fuel cell.

Accordingly, the flight mode determination process S220 may include an altitude change comparison process S222 of calculating an altitude change of the aircraft for a predetermined reference period of time, comparing the absolute value of the calculated altitude change with a preset reference altitude change, determining that the aircraft is in the cruising mode when the absolute value of the calculated altitude change is less than the reference altitude change, and determining that the aircraft is in the taking-off/landing mode when the absolute value of the calculated altitude change is greater than the reference altitude change. In other words, since the change in the altitude of the aircraft cruising is minimal, but the change in the altitude of the aircraft taking off or landing is substantial, the flight mode of the aircraft may be determined by using the change in the flight altitude in the altitude change comparison process S222.

The flight mode determination process S220 may further include a wing shape determination process S224 of determining that the aircraft is in the cruising mode when flaps of wings of the aircraft are in a neutral state and determining that the aircraft is in the taking-off/landing mode when the flaps of the wings of the aircraft are in a flat state. Accordingly, in the wing shape determination process S224, whether the aircraft is in the taking-off/landing mode requiring high output power or in the cruising mode requiring low output power may be determined by recognizing the states of the flaps using information about the angles and positions of the flaps.

At this time, in the flight mode determination process S220, the flight mode of the aircraft may be determined through at least one of the altitude change comparison process and the wing shape determination process, and the flight mode of the aircraft may be determined by a combination of determination results in the respective processes. Accordingly, the accuracy of the determination may be improved.

The aircraft monitoring step S200 may further include an output power comparison process S230 of comparing the output power requirement that has to be generated in the fuel cell for operation of the aircraft with preset reference output power and determining whether to change the oxygen supply means depending on a change in the output power requirement that has to be generated in the fuel cell, to supply compressed air to the fuel cell stack 10 by the compressor 100 when the output power requirement is less than the reference output power and pure oxygen stored in the small oxygen tank 200 is supplied to the fuel cell stack 10 when the output power requirement is greater than the reference output power.

In the output power comparison process S230, as the magnitude of the output power requirement that has to be generated in the fuel cell increases or decreases depending on a control command of a controller provided for operation of the aircraft, the supply of compressed air using the compressor 100 and the supply of pure oxygen from the small oxygen tank 200 may be automatically switched, and appropriate oxygen supply may be performed.

The oxygen supply means switching step S300 may include a valve switching control process S310 of controlling selective opening/closing of the compressed-air supply valve 110, which is provided at the output end from which compressed air generated by the compressor 100 is supplied, and the pure oxygen supply valve 210, which is provided at the output end from which pure oxygen stored in the small oxygen tank 200 is supplied, depending on the determination result of the aircraft monitoring device 300. Accordingly, the compressed-air supply valve 110 that opens and closes the path along which compressed air is directly supplied from the output end of the compressor 100 to the fuel cell stack 10 and the pure oxygen supply valve 210 that opens and closes the path along which pure oxygen is directly supplied from the small oxygen tank 200 to the fuel cell stack 10 are provided.

In the valve switching control process S310, the oxygen supply means for the fuel cell stack 10 may be changed by opening one of the compressed-air supply valve 110 and the pure oxygen supply valve 210 and closing the remaining valve. In other words, in response to determining in the aircraft monitoring step S200 that the compressor 100 alone is able to respond to the oxygen supply for generation of the output power of the aircraft (when the aircraft flies at the reference altitude or less or flies in the cruising mode, or when the output power requirement is less than the reference output power), the compressed-air supply valve 110 may be operated to remain open in the valve switching process S310. At this time, the pure oxygen supply valve 210 remains closed.

In response to determining in the aircraft monitoring step S200 that the compressor 100 is unable to respond to the oxygen supply for generation of the output power of the aircraft (when the aircraft flies at the reference altitude or more or flies in the taking-off/landing mode, or when the output power requirement is greater than the reference output power), in the valve switching process S310, the compressor 100 is turned off, the compressed-air supply valve 110 is closed, and the pure oxygen supply valve 210 is opened to supply pure oxygen from the small oxygen tank 200 to the fuel cell stack 10.

The oxygen supply means switching step S300 may further include a compressor OFF control process S320 of changing the oxygen supply means for the fuel cell stack 10 by turning off the compressor 100 while opening the pure oxygen supply valve 210, which is provided at the output end from which pure oxygen stored in the small oxygen tank 200 is supplied, or by closing the pure oxygen supply valve 210 while turning on the compressor 100, depending a determination result of the aircraft monitoring device 300.

Accordingly, the compressor 100 has to be implemented with a shut-off type compressor that, when turned off, is capable of automatically closing a path along which air is movable. When the compressor 100 is implemented with the shut-off type compressor, an output end of the shut-off type compressor may be directly connected to the fuel cell stack 10 without a separate supply valve, and the pure oxygen supply valve 210 may be provided on only the path extending from the small oxygen tank 200 to the fuel cell stack 10.

Accordingly, in the compressor OFF control process S320, when the supply path of compressed air is automatically closed while the shut-off type compressor is turned off, the pure oxygen supply valve 210 may be open, and pure oxygen may be supplied from only the small oxygen tank 200. When the shut-off type compressor is turned on and the supply path of compressed air is open, the pure oxygen supply valve 210 may be closed, and compressed air may be supplied from only the compressor 100. Accordingly, the oxygen supply means may be selectively changed.

The oxygen supply method for the fuel cell of the aircraft according to the present disclosure may include an additional oxygen supply step S500 of supplementing lack of oxygen with pure oxygen rather than selectively directly supplying compressed air supplied from the compressor 100 and pure oxygen supplied from the small oxygen tank 200 to the fuel cell stack 10. Accordingly, a supply path of pure oxygen stored in the small oxygen tank 200 may be connected to a supply path of compressed air that extends from the compressor 100 to the fuel cell stack 10, and the pure oxygen supply valve 210 capable of adjusting whether to additionally supply the pure oxygen may be provided.

In the additional hydrogen supply step S500, the additional oxygen supply controller 500 may be configured to consistently maintain the supply of compressed air from the compressor 100 to the fuel cell stack 10 and additionally supply a predetermined amount of pure oxygen to the path along which compressed air is supplied, only when the determination result in the aircraft monitoring step shows that required output power is difficult to generate with only oxygen of compressed air due to the high output power requirement of the aircraft and the high altitude thereof. Accordingly, sufficient oxygen for generation of the output power requirement may be supplied to the fuel cell stack 10.

As described above, only when high output power is required during operation of the aircraft, pure oxygen additionally supplied from the small oxygen tank 200 may be mixed with compressed air and supplied to the fuel cell stack 10. Accordingly, the supply of oxygen required for generation of high output power may be stably satisfied.

The present disclosure includes the compressor and the small oxygen tank as oxygen supply means, supplies compressed air to the fuel cell stack in a low output power section in which it is possible to respond to the output power requirement of the aircraft with only the compressed air generated by the compressor, and supplies pure oxygen to the fuel cell stack in a high output power section in which it is difficult to respond to the output power requirement of the aircraft with only the compressed air. Accordingly, the present disclosure may stably supply oxygen required for various operation environments of the aircraft without storing a large amount of pure oxygen.

Furthermore, the present disclosure supplies oxygen using only compressed air without using pure oxygen in a situation in which low output power is required. Accordingly, the present disclosure may minimize the capacity of pure oxygen that has to be stored in the oxygen tank, thereby reducing an increase in volume and weight and thus improving fuel economy of the aircraft. In addition, the present disclosure may provide various effects that are directly or indirectly recognized.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An oxygen supply apparatus for a fuel cell of an aircraft, the oxygen supply apparatus comprising:

a compressor configured to generate compressed air by compressing air in the atmosphere and supply the compressed air to a fuel cell stack;

an oxygen tank having a predetermined amount of oxygen stored therein;

an aircraft monitoring device configured to monitor the aircraft and determine whether oxygen supply from the oxygen tank is required; and an oxygen supply means switching device configured to switch an oxygen supply means for the fuel cell stack from the compressor to the oxygen tank depending on an outcome of the monitoring wherein the aircraft monitoring device includes:
a flight altitude determination device configured to determine whether to change the oxygen supply means depending on a change in a flight altitude of the aircraft so as to supply the compressed air to the fuel cell stack by the compressor when the flight altitude of the aircraft is lower than a preset reference altitude, or to supply the oxygen stored in the oxygen tank to the fuel cell stack when the flight altitude of the aircraft is higher than the reference altitude.

2. The oxygen supply apparatus of claim 1, wherein the flight altitude determination device includes:
an altitude comparator configured to receive a current flight altitude from an altimeter provided in the aircraft and compare the current flight altitude with the preset reference altitude.

3. The oxygen supply apparatus of claim 1, wherein the flight altitude determination device includes:
a cell voltage comparator configured to estimate the flight altitude of the aircraft by comparing the average of cell voltages measured by a stack voltage monitoring (SVM) device provided in the fuel cell with a preset reference voltage.

4. The oxygen supply apparatus of claim 3, wherein the cell voltage comparator is configured to estimate that the aircraft flies at an altitude lower than the reference altitude, when the average of the cell voltages measured by the stack voltage monitoring device is greater than the reference voltage, and the cell voltage comparator is configured to estimate that the aircraft flies at an altitude higher than the reference altitude, when the average of the cell voltages is less than the reference voltage.

5. The oxygen supply apparatus of claim 1, wherein the aircraft monitoring device includes:
a flight mode determination device configured to determine whether a flight mode of the aircraft is a cruising mode or a taking-off/landing mode and determine whether to change the oxygen supply means depending on a change in the flight mode of the aircraft, such that when the flight mode is the cruising mode, the compressed air is supplied to the fuel cell stack by the compressor, and when the flight mode is the taking-off/landing mode, the oxygen stored in the oxygen tank is supplied to the fuel cell stack.

6. The oxygen supply apparatus of claim 5, wherein the flight mode determination device includes:
an altitude change comparator configured to calculate an altitude change of the aircraft for a predetermined reference period of time, compare an absolute value of the calculated altitude change with a preset reference altitude change, determine that the aircraft is in the cruising mode when the absolute value of the calculated altitude change is less than the reference altitude change, and determine that the aircraft is in the taking-off/landing mode when the absolute value of the calculated altitude change is greater than the reference altitude change.

7. The oxygen supply apparatus of claim 5, wherein the flight mode determination device includes:
a wing shape determination device configured to determine that the aircraft is in the cruising mode when a flap of a wing of the aircraft is in a neutral state and determine that the aircraft is in the taking-off/landing mode when the flap of the wing of the aircraft is in a flat state.

8. The oxygen supply apparatus of claim 1, wherein the aircraft monitoring device includes:
an output power comparator configured to compare an output power requirement that has to be generated in the fuel cell for operation of the aircraft with preset reference output power and determine whether to change the oxygen supply means depending on a change in the output power requirement that has to be generated in the fuel cell to supply the compressed air to the fuel cell stack by the compressor when the output power requirement is less than the reference output power and the oxygen stored in the oxygen tank is supplied to the fuel cell stack when the output power requirement is greater than the reference output power.

9. The oxygen supply apparatus of claim 1, wherein the oxygen supply means switching device includes:
a valve switching controller configured to execute selective opening/closing of a compressed-air supply valve and a pure oxygen supply valve depending on a determination result of the aircraft monitoring device,
wherein the compressed-air supply valve is provided at an output end from which the compressed air generated by the compressor is supplied, and the pure oxygen supply valve is provided at an output end from which the oxygen stored in the oxygen tank is supplied.

10. The oxygen supply apparatus of claim 9, wherein the valve switching controller is configured to switch the oxygen supply means for the fuel cell stack by opening one of the compressed-air supply valve and the pure oxygen supply valve and closing the remaining valve.

11. The oxygen supply apparatus of claim 1, wherein the compressor is implemented with a shut-off type compressor configured to, when turned off, automatically close a path along which air is movable, and wherein the oxygen supply means switching device includes:
a compressor OFF controller configured to change the oxygen supply means for the fuel cell stack by turning off the compressor while opening a pure oxygen supply valve provided at an output end from which the oxygen stored in the oxygen tank is supplied, or by closing the pure oxygen supply valve while turning on the compressor, depending on a determination result of the aircraft monitoring device.

12. An oxygen supply apparatus for a fuel cell of an aircraft, the oxygen supply apparatus comprising:
a compressor configured to generate compressed air by compressing air in the atmosphere and supply the compressed air to a fuel cell stack;
an oxygen tank having a predetermined amount of oxygen stored therein and including a pure oxygen supply valve configured to adjust whether to supply the oxygen, wherein an oxygen supply path is connected to a compressed-air supply path extending from the compressor to the fuel cell stack;

an aircraft monitoring device configured to monitor the aircraft and determine whether oxygen supply from the oxygen tank is required; and an additional oxygen supply controller configured to adjust whether to open or close the pure oxygen supply valve, depending on a monitoring result and perform control such that oxygen supplied to the fuel cell stack is only the compressed air, or a mixture of the compressed air and the oxygen, wherein the additional oxygen supply controller is configured to consistently maintain the supply of the compressed air from the compressor to the fuel cell stack and additionally supply the predetermined amount of oxygen to the compressed-air supply path when a flight altitude of the aircraft is higher than a preset reference altitude.

13. The oxygen supply apparatus of claim 12, wherein the additional oxygen supply controller is configured to consistently maintain the supply of the compressed air from the compressor to the fuel cell stack and additionally supply the predetermined amount of oxygen to the compressed-air supply path only when a determination result of the aircraft monitoring device shows that required output power of the aircraft is higher than preset reference output power, or a flight mode of the aircraft is a taking-off/landing mode.

14. An oxygen supply method for a fuel cell of an aircraft, the oxygen supply method comprising:

compressing, by a compressor, air in the atmosphere to generate compressed air and supplying the compressed air to a fuel cell stack;

monitoring the aircraft to determine whether the compressed air supplied from the compressor is able to respond to an output power requirement of the aircraft or whether oxygen supply from an oxygen tank is required;

switching an oxygen supply means for the fuel cell stack from the compressor to the oxygen tank, or vice versa depending on an outcome of the monitoring; and supplying oxygen stored in the oxygen tank to the fuel cell stack when the oxygen supply means is switched to the oxygen tank, wherein aircraft monitoring includes:

determining whether to change the oxygen supply means depending on a change in a flight altitude of the aircraft so as to supply the compressed air to the fuel cell stack by the compressor when the flight altitude of the aircraft is lower than a preset reference altitude, or supply the oxygen stored in the oxygen tank to the fuel cell stack when the flight altitude of the aircraft is higher than the reference altitude.

15. The oxygen supply method of claim 14, wherein the aircraft monitoring includes:

determining whether a flight mode of the aircraft is a cruising mode or a taking-off/landing mode and determining whether to change the oxygen supply means depending on a change in the flight mode of the aircraft, such that when the flight mode is the cruising mode, the compressed air is supplied to the fuel cell stack by the compressor, and when the flight mode is the taking-off/landing mode, the oxygen stored in the oxygen tank is supplied to the fuel cell stack.

16. The oxygen supply method of claim 14, wherein the aircraft monitoring includes:

comparing an output power requirement that has to be generated in the fuel cell for operation of the aircraft with preset reference output power and determining whether to change the oxygen supply means depending on a change in the output power requirement that has to be generated in the fuel cell to supply the compressed air to the fuel cell stack by the compressor when the output power requirement is less than the reference output power and the oxygen stored in the oxygen tank is supplied to the fuel cell stack when the output power requirement is greater than the reference output power.

17. The oxygen supply method of claim 14, wherein the oxygen supply means switching includes:

executing selective opening/closing of a compressed-air supply valve and a pure oxygen supply valve depending on a determination result in the aircraft monitoring, wherein the compressed-air supply valve is provided at an output end from which the compressed air generated by the compressor is supplied, and the pure oxygen supply valve is provided at an output end from which the oxygen stored in the oxygen tank is supplied.

18. An oxygen supply method for a fuel cell of an aircraft, the oxygen supply method comprising:

compressing, by a compressor, air in the atmosphere to generate compressed air and supplying the compressed air to a fuel cell stack;

monitoring the aircraft to determine whether the compressed air supplied from the compressor is able to respond to an output power requirement of the aircraft or whether oxygen supply from an oxygen tank is required; and consistently maintaining the supply of the compressed air from the compressor to the fuel cell stack and additionally supplying oxygen stored in the oxygen tank to a path along which the compressed air is supplied, when a determination result in the aircraft monitoring indicates unresponsive to the output power requirement with only oxygen in the compressed air due to a high output power requirement of the aircraft or a high altitude thereof.

* * * * *